United States Patent
Lakshmanan et al.

(10) Patent No.: US 6,500,396 B1
(45) Date of Patent: Dec. 31, 2002

(54) SEPARATION OF TITANIUM HALIDES FROM AQUEOUS SOLUTIONS

(76) Inventors: Vaikuntam Iyer Lakshmanan, 3427 Mulcaster Road, Mississauga, Ontario, L5L 5B1 (CA); Ramamritham Sridhar, 1850 Rathburn Road East, Ph#2, Mississauga Ontario, L4W 2X9 (CA); Marc Murray Rishea, 2214 Belgrave Court, Burlington, Ontario, L7P 3R5 (CA); Robert Joseph de Laat, 1557 Cuthbert Avenue, Mississauga, Ontario, L5M 3R6 (CA)

( * ) Notice: Subject to any disclaimer, the term of this patent is extended or adjusted under 35 U.S.C. 154(b) by 0 days.

(21) Appl. No.: 09/441,131

(22) Filed: Nov. 17, 1999

(30) Foreign Application Priority Data

Nov. 17, 1998 (CA) ............................................. 2254249

(51) Int. Cl.⁷ ............................................... C22B 34/00
(52) U.S. Cl. ............................ 423/70; 423/76; 423/82
(58) Field of Search ............................ 423/70, 76, 82, 423/492; 75/416, 612

(56) References Cited

U.S. PATENT DOCUMENTS

| | | | | |
|---|---|---|---|---|
| 2,754,256 A | * | 7/1956 | Stambaugh | ................. 423/76 |
| 2,879,132 A | * | 3/1959 | Cauwenberg et al. | ......... 423/76 |
| 3,102,785 A | * | 9/1963 | Bristow | ...................... 423/76 |
| 3,104,950 A | | 9/1963 | Ellis | |
| 4,269,809 A | * | 5/1981 | Tolley et al. | ................. 423/70 |
| 5,948,212 A | * | 9/1999 | Kilty et al. | .................... 423/76 |

FOREIGN PATENT DOCUMENTS

| | | | | |
|---|---|---|---|---|
| CA | 586919 | * | 11/1959 | ................. 423/492 |
| GB | 744074 | * | 2/1956 | ................. 423/492 |
| JP | 58-15031 | * | 1/1983 | |
| JP | 58-015031 | | 1/1983 | |
| NL | 405780 | * | 5/1964 | ................. 423/76 |
| SU | 451761 | * | 3/1975 | ................. 423/492 |
| WO | WO01/00530 A1 | | 6/1999 | |
| WO | WO01/00531 A1 | | 6/1999 | |

* cited by examiner

Primary Examiner—Steven Bos
(74) Attorney, Agent, or Firm—Caesar, Rivise, Bernstein, Cohen & Pokotilow, Ltd.

(57) ABSTRACT

A method for the production of titanium metal from titanium-bearing ore. The method comprises leaching said ore or a concentrate thereof with an aqueous solution of a hydrogen halide; separating solids from the leach solution, to provide a leachate solution. The leachate solution may be subjected to extraction with an immiscible organic phase. Titanium halide is separated from the organic phase by stripping. Preferably, the titanium halide is titanium tetrachloride.

12 Claims, No Drawings

SEPARATION OF TITANIUM HALIDES FROM AQUEOUS SOLUTIONS

FIELD OF THE INVENTION

The present invention relates to methods for the separation of titanium from ore, especially iron-bearing ore e.g. ilmenite ore. In embodiments of the invention, the method relates to the recovery of titanium tetrahalides, especially titanium tetrachloride from solutions. In further embodiments, the invention relates to recovery of titanium metal from such ore.

BACKGROUND OF THE INVENTION

Many processes are known for the recovery of titanium dioxide from ores. Ilmenite, which contains mainly titanium oxide and iron oxide values, often is employed in such processes. The majority of processes for the recovery of titanium dioxide from ores involve digestion of the ore in a mineral acid, such as hydrochloric acid or sulphuric acid, to remove at least the titanium values from the ore. In such processes, however, the purity of the titanium dioxide produced is about 90–95%, and hence further purification procedures may be required to produce a pigment grade product, which adds considerably to the cost. Many of the further purification procedures involve techniques that are environmentally unacceptable without extensive procedures to treat various solutions and solids obtained. Such treatment processes tend to be costly.

Processes for the recovery of titanium dioxide from ilmenite in high purity and high yield are known. One such process is described in U.S. Pat. No. 3,903,239 of S. A. Berkovich, which discloses a process which comprises contacting ilmenite, or a concentrate thereof, in particulate form with concentrated hydrochloric acid at a temperature of about 15–30° C. to solubilize and leach from the ore at least 80%, preferably at least 95%, of the iron and titanium values. The leaching operation may be carried out over an extended period of time, typically from 3–25 days, depending on the technique employed and the quantity of iron values to be recovered. Leaching techniques include counter-current flow or the use of closed cycle loops in which hydrochloric acid is continuously passed through a bed of the ore. The leaching operation is exothermic, and the reactants are maintained in a temperature range of 15–30° C. by cooling, if necessary.

The ilmenite or similar ore used in the process may be treated as such or may be beneficiated to form a concentrate in any desired manner. Ilmenite generally contains $TiO_2.FeO$ with varying amounts of $Fe_2O_3$ and gangue materials, usually silicates, alumina, lime and magnesium. Beneficiation may be employed when the ore is of low $TiO_2$ content.

The ore or concentrate may be pre-treated prior to contact with the concentrated hydrochloric acid to increase the rate of dissolution of the titanium and iron values during the leaching step. Such pre-treatment may include an initial oxidation at elevated temperature, such as from 600–1000° C., in the presence of air and/or oxygen to split the $TiO_2.FeO$ followed by reduction of at least part of the iron oxide with carbon or carbon monoxide. This is a smelting step, with slag from the smelting step being fed to the leaching step and pig iron being marketed.

Subsequent to the leaching step, it is necessary to convert any ferric iron in the solution to ferrous iron, which is typically achieved by reduction of the ferric iron in the leach liquor with a gaseous reducing agent e.g. sulphur dioxide. The conversion of ferric iron to ferrous iron in this manner is essential in view of the affinity of titanium dioxide for ferric iron and the difficulty in separating ferric iron from titanium dioxide.

The solution of titanium chlorides and ferrous chloride which is thus obtained, and which may contain minor quantities of gangue metal chlorides, typically calcium and magnesium materials, is then mixed with water to cause hydrolysis of the titanium chlorides. A seeding amount, generally about 1–2%, by weight of the titanium oxyhydrate to be precipitated ($TiO_{2.3}H_2O$) is included in the mixture. Titanium oxyhydrate precipitates from the mixture. The hydrolysis is carried out using a quantity of water at least sufficient to precipitate substantially all of the titanium values from the solution but insufficient to cause precipitation of other metal oxides or hydroxides. The titanium oxyhydrate that is precipitated from the mother liquor is then washed substantially free of entrained mother liquor and dried. The washed precipitate is converted at elevated temperature, typically 700–1000° C., in the presence of air and/or oxygen into the anatase or rutile form of titanium dioxide.

Alternative methods that require less treatment of solution and solids to ensure environmental acceptance and/or are less expensive in achieving environmental acceptance, as well as producing titanium and other products of high value e.g. high purity, are required.

SUMMARY OF THE INVENTION

A method for the separation of titanium, and for production of titanium metal, from titanium-bearing ore that involves a reduced number of steps has now been found.

Accordingly, one aspect of the present invention provides a method for the separation of iron values from titanium-bearing ore, comprising the steps of:

a) leaching said ore, or a concentrate thereof, with an aqueous solution of a hydrogen halide;

b) separating solids from the leach solution obtained in (a), to provide a leachate solution;

c) subjecting the leachate solution to extraction with an immiscible organic phase that selectively extracts iron values into said organic phase, titanium values in the leachate solution selectively remaining in the aqueous leachate solution.

Another aspect of the invention provides a method for the production of titanium metal from titanium-bearing ore, comprising the steps of:

a) leaching said ore or a concentrate thereof with an aqueous solution of a hydrogen halide;

b) separating solids from the leach solution obtained in (a), to provide a leachate solution;

c) subjecting the leachate solution to extraction with an immiscible organic phase having a boiling point that differs from the boiling point of the titanium halide in the leachate by an amount that permits separation thereof by fractional distillation, said organic phase being stable with respect to the titanium halide; and d) stripping titanium halide from the organic phase obtained in step (c) by heating to volatilize the titanium halide and effect separation from the organic phase.

A further aspect of the invention provides a method of separating a titanium halide from a concentrated aqueous solution of the titanium halide, said titanium halide being in a concentration such that the titanium halide is substantially stable in said aqueous solution, comprising:

a) admixing said aqueous solution with an organic phase having a boiling point that differs from the boiling point of the titanium halide by an amount that permits separation thereof by fractional distillation;
b) separating the organic phase so obtained from the aqueous solution; and
c) heating the organic phase and stripping titanium halide therefrom.

Yet another aspect of the invention provides a method for the separation of titanium from a titanium-bearing ore, said ore containing iron, comprising the steps of:
a) leaching said ore, or a concentrate thereof, with an aqueous solution of a hydrogen halide in the presence of an oxidising agent; and
b) effecting a separation of titanium dioxide obtained in step (a) from said solution.

A further aspect of the invention provides a method of forming a titania-rich slag from a titanium-bearing ore that contains iron, comprising the steps of:
a) calcining the ore under oxidizing conditions to eliminate sulphur from said ore, said calcining being carried out at a temperature of at least 1200° C.;
b) subjecting the hot calcined ore of step (a) to reducing conditions in the presence of CO;
c) transferring the hot reduced calcined ore obtained in step (b) to a smelting step;
controlling the reducing conditions and the smelting step to obtain pig iron and a titania-rich slag with a predetermined iron content.

Another aspect of the invention provides a method of forming a titania-rich slag from a titanium-bearing ore that contains iron, comprising the steps of:
a) calcining the ore under oxidizing conditions to eliminate sulphur from said ore, said calcining being carried out at a temperature of at least 1200° C.;
b) subjecting the hot calcined ore of step (a) to reducing conditions in the presence of CO;
c) transferring the reduced calcined ore obtained in step (b) to a leaching step in an aqueous solution of weak sulphuric acid; controlling the reducing and leaching conditions to obtain a titania-rich material having less than 5% by weight of the iron content of the ore.

A further aspect of the invention provides a method for the separation of iron and titanium values from an iron/titanium ore, comprising the steps of:
a) leaching said ore, or a concentrate thereof, with an aqueous solution of a hydrogen halide in the presence of an oxidising agent; and effecting a separation of titanium dioxide obtained from said solution. b) subjecting the aqueous leach solution so obtained to extraction with an immiscible organic phase that selectively leaches iron values into said organic solvent.

Yet another aspect of invention provides a method for the separation of iron values from titanium-bearing ore, comprising the steps of:
a) leaching said ore, or a concentrate thereof, with an aqueous solution of a hydrogen halide;
b) separating solids from the leach solution obtained in (a), to provide a leachate solution;
c) subjecting the leachate solution to extraction with an immiscible organic phase that selectively extracts iron values into said organic phase, titanium values in the leachate solution selectively remaining in the aqueous leachate solution.
d) subjecting the aqueous raffinate so obtained to steps to separate $TiO_2$ therefrom.

DETAILED DESCRIPTION OF THE INVENTION

Processes for the recovery of titanium dioxide from ilmenite, with high purity in high yield, are known. Techniques for treating the ilmenite ore, optionally to form concentrate and/or for beneficiation of the ore are known. In some instances, it is possible to treat the ore or concentrate with concentrated hydrochloric acid solution to effect a leaching of titanium values from the ore or concentrate. In other instances, it is necessary or desirable to subject the ore or concentrate to a smelting step in the presence of carbon and/or fluxing agents, and to then separate a slag from the smelting process which is then subjected to the leaching step.

One aspect of the present invention is directed to the step of recovery of titanium values from the leaching solution. The leaching solution is a mixture of aqueous hydrochloric acid containing titanium values, and other soluble material and solid materials, particularly residues of the concentrate and/or slag from which the titanium values have been leached. A liquid/solid separation step is conducted, to separate a leachate solution from solids.

The leachate so obtained is treated, according to an aspect of the present invention, with an organic phase. The titanium values in the leachate are in the form of titanium halide, especially titanium tetrahalide which, if hydrochloric acid is used in the leaching step, will be titanium tetrachloride.

In one aspect of the invention, the organic phase is selected so that iron values are selectively separated into the organic phase. Thus, an organic/aqueous separation is effected, with the iron values being in the organic phase and titanium values remaining in the aqueous phase. Preferably, iron values are separated almost to the exclusion of other values in the leachate solution, or with values readily separated therefrom, so that iron products especially iron oxides, may be obtained in high purity. Vanadium and other metal values that may be present in the leachate are preferably retained in the aqueous phase.

Examples of the organic phase are phosphoric, phosphoric acid and phosphinic acids, esters oxides thereof. Specific examples are tri-n-butyl phosphate and di-2-ethylhexyl phosphoric acid. The organic phase preferably contains a diluent e.g. a hydrocarbon, an example of which is a kerosene.

The organic phase may be stripped from the iron values and recycled. The iron values may then be subjected to pyrohydrolysis, or other steps, to recover iron e.g. as iron oxides. Preferably HCl is obtained as a by-product which is recycled to the step of leaching of ore or concentrate described above.

In a second aspect, the organic phase is selected such that the titanium halide is soluble in the organic phase. Moreover, the organic phase is selected such that the organic phase and titanium halide may be separated by fractional distillation. The organic phase may be selected to have a higher or lower boiling point that the titanium halide. The preferred titanium halide is titanium tetrachloride. In embodiments of the invention, the boiling point of the organic phase differs by least 50° C., and especially at least 75° C., from the boiling point of the titanium halide. The organic phase must be immiscible with the aqueous solution, such that it forms a second layer so that separation may be effected.

The titanium halide is extracted from the aqueous solution into the organic phase, to effect removal of the titanium halide from the aqueous solution. Such extraction may be carried out in a continuous operation or in a batch operation.

The organic phase may be, for example, a crown ether, phosphine acid, ester or oxide, or tertiary or quarternary ammonium salt.

The organic phase containing the titanium halide is separated from the aqueous solution and from any solid matter, and is then subjected to a step to separate the titanium tetrachloride. In the separation step, the organic phase containing the titanium halide is heated to effect the separation of the titanium halide. This is preferably accomplished by volatilization of the titanium halide, especially if the halide is chloride although for any particular tetrahalide the organic phase may be selected to effect volatilization of either the titanium tetrahalide or the organic phase. In addition, the organic phase should be selected so that it has a flash point that is acceptable under the operating conditions, preferably a flash point above the temperature used in separation. The organic phase needs to be stable with respect to the aqueous solution and to the titanium tetrahalide at the operating conditions.

The aqueous solution remaining after extraction may be subjected to known procedures for recovery of iron or other metal values or procedures described above, and for recovery and recycle of acid used in the leaching step. For example, iron oxide ($Fe_2O_3$) may be recovered and the acid e.g. HCl, recycled. The organic phase is preferably recycled back to the extraction step, and reused.

The titanium tetrahalide may be subjected to purification steps, if necessary. However, if the titanium tetrahalide is volatilized, it may be of acceptable purity for many end-uses. The titanium halide may be used as such or subjected to further processing steps e.g. to form titanium metal. Techniques for the conversion of titanium tetrahalide and titanium dioxide to titanium metal are known.

In embodiments of the invention, essentially all of the iron of the feed material i.e. titanium-bearing ore or concentrate is dissolved by the HCl. Thus, sufficient HCl has to be provided. In order to minimise the amount of HCl required in the process, the iron chloride (e.g. $H^+FeCl^-_4$ or a chloride of iron e.g. $FeCl_3$) produced in the process is subsequently subjected to pyrohydrolysis to regenerate the HCl. The iron is converted into an iron oxide product ($Fe_2O_3$). By controlling the composition of the iron chloride solution before subjecting it to pyrohydrolysis, it is possible to produce a high grade iron oxide suitable for use in pigment production. If this is not economic, the disposal of iron oxide becomes an environmental problem. In such instances, it is advantageous to remove the iron and upgrade the titanium ore before subjecting it to treatment with HCl. This alternative also has the advantage of decreasing the size of the hydrometallurgical plant for a given production of titanium.

In another aspect of the present invention, the ore or concentrate is leached in aqueous solution in the presence of an acid and an oxidizing agent. A variety of oxidizing agents may be used, including air, hydrogen or other peroxides, or sodium or other perchlorates. The oxidizing agent should be selected to minimize any contamination of the solution with cations that have an adverse effect on other process steps.

In the aqueous solution, the titanium is converted to titanium dioxide and the iron is solubilized. The acid is preferably a hydrogen halide, especially HCl. If the acid is HCl, the concentration of acid may be controlled, in the presence of the oxidizing agent, to convert iron into $H^+FeCl^-_4$, which is soluble in the aqueous solution. Subsequently, liquid/solid separations may be effected, to separate $TiO_2$ including separation of $TiO_2$ from tails from the aqueous solution. The aqueous solution may be treated for recovery of HCl and iron e.g. as $Fe_2O_3$.

One of the concentration alternatives for the treatment of the ilmenite ore or physically beneficiated ilmenite is the production of a titanium-rich slag and pig iron from it, with the titanium-rich slag being subjected to HCl leaching for titanium recovery and the iron being sold as a foundry-grade pig iron.

The processing of ilmenite to produce titania slag and pig iron is known. In such processing, the concentrate is calcined in a rotary kiln under oxidising conditions at about 1200–1300° C. to eliminate sulphur in the ilmenite concentrate. The product is cooled and fed to an electric furnace with coal/coke as reductant to reduce the iron and produce a molten slag and pig iron. The electric furnace smelting takes place at about 1650° C. Disadvantages of the current processing method include (i) the energy in the calcine from the rotary kiln is lost and the product must be re-heated to the smelting temperature in the electric furnace with electric power; (ii) the reduction in the electric furnace produces a lot of CO gas, which often results in the foaming of the slag and process control is difficult; and (iii) the reduction of the iron oxide by carbon to produce CO is endothermic and the heat required is supplied by electricity.

The production of electricity from fuel is typically energy inefficient, to the extent of about 30% conversion, and therefore the process is very energy intensive.

In aspects of the present invention, the use of energy is reduced. In a preferred embodiment, the reduction of the calcine is carried out prior to the electric furnace smelting. This may be carried out in a second reducing section of the calcining kiln or a separate kiln following the calcining kiln. The reduction is done by reducing gases produced by the partial reduction of CO (produced in the electric furnace) and/or by partial combustion of fuel. The reduced calcine so produced is transferred hot from the reduction kiln to the electric furnace, with any additional reductant if required. This saves the energy lost in cooling the calcine and improves the efficiency of use of fuel for the iron oxide reduction. The smelting of reduced calcine requires less electric energy, produces very little gas in the electric furnace and makes the electric furnace easier to control. The reduction in the reduction step and the electric furnace are controlled to provide a desired iron level in the slag. This controls the slag melting temperature. Depending on the composition of the ilmenite concentrate, the smelting may be carried out at lower temperatures e.g. 1550° C., thereby conserving more energy compared to the current processing.

Alternatively, the process of smelting and production of molten titania-rich slag and pig iron in the final step of the above process may be replaced by a leaching process for removing the reduced iron produced in the reduction step. This may be carried out by dissolving it in a weakly acidic chloride solution, with aeration, to dissolve the iron and leave a titania-rich oxide product suitable for HCl leaching, as described herein. The advantage of this approach is that the reduction can be carried out at lower temperature e.g. about 800° C. instead of about 1000° C. and the energy of smelting in the electric furnace is conserved. In addition, in this embodiment, it is possible to eliminate over 95% of the iron and minimise the iron fed to the HCl leaching process. In comparison, there is about 90% iron removal in the smelting route, as some iron has to be left behind to provide a fluid slag in the smelting step. This minimises the usage of HCl and the subsequent regeneration of the HCl for re-use in the process.

In the production of titanium and $TiO_2$ pigment, it is necessary to produce titanium chloride by chlorination of titanium dioxide-containing materials e.g. titania slag and rutile concentrate, at about 900° C. in the presence of coke. By using the present process, the titanium chloride may be produced by leaching the titania containing material with HCl followed by extraction and separation of titanium chloride. The high temperature chlorination is replaced by lower temperature operations and avoids the formation of environmentally unacceptable dioxins which can form in the high temperature chlorination. In addition, the purity of the titanium chloride produced in the present process will be improved and will require less purification or even no purification.

In various aspects of the invention, there is provided a process in which titanium-bearing ore or concentrate, generally after having been subjected to a smelting step, is subjected to a leaching step using aqueous hydrochloric acid. A leach solution containing titanium and iron values, and other metallic values depending on the particular ore, is obtained. A liquid/solid separation step is conducted. The solids may be subjected to other separation steps but generally will be gangue.

In preferred aspects of the invention, the leachate solution is subjected to extraction with organic phase to extract iron values, as described above. Such phase may contain 100–200 g/l of iron, or more. Examples of the organic phase are tri-n-butyl phosphate and di-2-ethylhexyl phosphoric acid, with other examples being described above. The organic phase with iron values is then subjected to steps to separate and recover the organic phase, which is recycled to the step of extraction of the leachate solution. Iron values, which are in the form of chlorides are recovered, especially by pyrohydrolysis to yield iron oxides and HCl. The HCl is recycled to the leaching of the ore or concentrate. Iron values of high purity may be obtained.

The leached aqueous solution or raffinate may be treated to separate vanadium and other metallic values, depending on the particular ore, especially by precipitation, to provide a raffinate rich in titanium, and preferably with high-purity titanium values. The titanium values are in the form of the chlorides viz $TiCl_4$, which may be subjected to steps to form $TiO_2$, which is recovered. High purity $TiO_2$ may be obtained, which may be of sufficiently high purity for use as such.

As an alternative, the raffinate rich in titanium values may be subjected to further extraction, using an organic phase that is immiscible in water and which has a boiling point that differs from the boiling point of the titanium value, e.g. titanium tetrachloride by an amount to permit fractional distillation. The titanium value is extracted from the aqueous solution of the raffinate into the organic phase and then recovered by distilling or flashing off either the organic phase or the titanium value, depending on the respective boiling points. Titanium metal may then be recovered from the titanium halide.

The by-products of such a process are minimized, and may be treated by known but relatively simple techniques.

An alternative separation of titanium values is to separate the titanium as $TiO_2$ directly from the leaching of the ore or concentrate, by leaching in the presence of an oxidizing agent and separating the $TiO_2$ formed from the solution and from other solids therein.

The present invention provides methods for the separation of titanium from titanium-bearing ores, especially ilmenite. In particular, the invention provides methods for production of titanium tetrahalides, especially titanium tetrachloride, and $TiO_2$ with improved purity and/or such that related steps in an overall process, including recovery and recycle of materials, may be simplified and be more cost effective. In particular, the volumes of liquid and solids that must be handled in the overall separation process may be reduced, and associated hardware may be reduced in size. Such improvements may be of significant economic benefit.

The present invention is illustrated by the following examples.

EXAMPLE I

A sample of a concentrate of a titanium-bearing ore of a particle size such that 59% by weight would pass through a 100 mesh screen, was subjected to HCl in an amount estimated to be 100% of the stoichiometric amount of chloride required for the amount of titanium in the concentrate. The temperature was 95° C.

The amount of concentrated HCl was 541.5 g, for 100 g of concentrate. After a period of 2 hours, 10 g of $NaClO_3$ were added.

The total treatment time was 3 hours.

The calculated amount of titanium in the samples was 18.5 g, and the amount of iron was calculated to be 39.8 g.

The resultant solution was filtered, washed with an acid solution (HCl) and then with water. The solution were analyzed. The results obtained were as follows:

TABLE 1

| Test Sample | Vol (ml) | Wt (g) | Assay - mg/l | | Weight Recovered - g | | % Recovered | |
|---|---|---|---|---|---|---|---|---|
| | | | Ti | Fe | Ti | Fe | Ti | Fe |
| Feed Solids | | 100 | 19.5 | 38.7 | 19.500 | 38.700 | | |
| Filtrate-Pregnant | 400 | | 360 | 89300 | 0.144 | 35.720 | 0.74 | 92.30 |
| Acid Wash Water | 825 | | 17 | 3560 | 0.014 | 2.937 | 0.07 | 7.59 |
| Wash Water | 500 | | 2.2 | 100 | 0.001 | 0.050 | 0.01 | 0.13 |
| Tails + 200 Mesh | | 6.50 | 9.62 | 9.68 | 0.63 | 0.63 | 3.21 | 1.63 |
| Tails − 200 Mesh | | 37.40 | 47.5 | 1.15 | 17.77 | 0.43 | 91.10 | 1.11 |
| % Dissolution | | 56.10 | | | | | | |
| Weight dissolved | | 56.1 | | | | | | |
| Total | | | | | 18.549 | 39.766 | 95.13 | 102.76 |

This example shows the use of oxidant in the recovery of titanium metal values, as $TiO_2$, from a titanium bearing ore. Titanium is effectively separated from iron, as indicated by the high iron content of the filtrate and the low iron content of the fine tails.

EXAMPLE II

Initial test work on extraction of synthetic titanium chloride solution showed that trialkyl phosphine oxide (Cyanex™ 923) could be a good candidate for titanium extraction. Tests were then conducted on leach solution produced by leaching of ilmenite concentrate. These tests showed that iron preferentially loads into trialkyl phosphine oxide from a solution containing titanium and iron. In a typical test, pregnant leach liquor diluted with an equal volume of distilled water, assaying 30.1 g/l Titanium and 30.0 g/l Iron, was contacted with HCl pre-conditioned 100% trialkyl phosphine oxide. In this test, sodium chlorate ($NaClO_3$), was added to the aqueous phase to raise the EMF of the pregnant leach liquor from 406.3 mv to 567.3 mv to aid the extraction. Employing an organic to aqueous ratio of 1:2 and a 30 minute contact time at 25° C. for extraction yielded an aqueous raffinate assaying 27.5 g/l Titanium and 2.15 g/l iron. This represented an extraction efficiency of 93% for iron and 8.6% for titanium.

This example illustrated that iron could be extracted first from the leach solution.

EXAMPLE III

Test work on different extractants showed that tri-n-butyl phosphate (TBP) is a good candidate for iron extraction from the leach solution prior to titanium extraction. Large volumes of titanium-containing aqueous leach solution prepared for extraction testing were repeatedly contacted with 100 vol. % TBP at 40° C. at a 2:1 or 3:1 organic/aqueous phase ratio. After 6 to 8 full contacts, the resulting aqueous raffinate assayed <50 ppm iron. This confirmed the feasibility of extracting iron from leach solutions. The titanium is not extracted by TBP and therefore it is possible to selectively remove iron from leach solution. In these tests it was seen that when using 100% TBP the iron containing organic is viscous and it was therefore considered preferable to use TBP with a diluent.

A 20% TBP solution in CF-231 kerosene diluent was used to determine the extraction and stripping isotherms. The organic phase was pre-conditioned with 200 g/l hydrochloric acid prior to extraction of the iron. The feed aqueous used for these tests analyzed as follows (ppm): Ti 33700, Fe 76000, Al 210, B <5, Ba <1, Ca 150, Cd <5, Co <5, Cr 180, Cu 36, K <100, Mg 1450, Mn 160, Mo 5, Na 2400, Ni 4.8, Pb 30, and Zn 14.

Varying phase ratios of organic and aqueous phases were tested with beaker/magnetic stiffer bar contacts at 40° C. for an interval of 10 minutes. The observations in these tests were as follows:

1. 20 volume % TBP in CF-231 diluent organic phase saturates at about 22 g/l of Fe.
2. The organic-aqueous separation is fast and is complete in about 1 minute.
3. A contact time of 10 minutes provides for the transfer from the aqueous to organic phases.
4. These results show that an aqueous pregnant leach solution assaying 75 g/l iron, may be extracted using 20 volume percent Tri-Butyl Phosphate in CF-231 diluent in two or three stages at 40° C. contacting 5 parts Aqueous and 1 part Organic for 10 minutes.

EXAMPLE IV

After iron extraction, the TBP is stripped to remove the iron and the organic phase should be returned to the extraction step. Iron extraction was theoretically shown to require five or six stages using 20 volume % TBP. A stripping isotherm was charted after contacting varying phase ratios of organic and aqueous at 40° C. for 5 minute contact intervals. Leach pregnant solution was used to fully load 20 volume percent TBP in 80 volume percent CF-231. Repeated contacts of fresh aqueous with one organic volume produced a loaded organic solution assaying about 22 g/l iron. This organic solution was stripped with a 13.7 g/l hydrochloric acid solution.

Varying phase ratios of organic and aqueous solution were tested with beaker/magnetic stiffer bar contacts at 40° C. for an interval of 5 minutes. The observations and analytical results are tabled below:

1. Iron loaded organic assaying 22 g/l iron, can be stripped efficiently with mild HCl at 13.7 g/l concentration in six stages at 40° C. contacting 1 volume of aqueous with 4 volumes of loaded organic.
2. The organic tested viz. 20 volume percent Tri-n-Butyl Phosphate in CF-231 diluent, can be stripped in a six stage counter-current contact to a concentration of 106 ppm iron. This stripped organic can be recycled for extracting iron.
3. By manipulating the concentration of TBP in CF-231 diluent and by increasing the contact phase ratio to 10:1 organic/aqueous, pregnant strip solutions can be achieved higher than the 75 g/l Fe obtained in this isothermal testwork. An example based upon theoretical loading of 60 volume % TBP would be an iron concentration of 250 g/L achieved in the pregnant strip solution.

An example of one run is shown in the attached Table 2.

A bulk TBP raffinate was produced in a series of extraction contacts of pregnant leach liquor with barren TBP organic. This raffinate analyzed as follows (the composition of the feed aqueous is given in Example III):

Al 500 ppm, B <5 ppm, Ba <1 ppm, Ca 230 ppm, Cd <5 ppm, Co <5 ppm, Cr 340 ppm, Cu 44 ppm, Fe <50 ppm, K <100 ppm, Mg 2520 ppm, Mn 390 ppm, Mo <5 ppm, Na 8030 ppm, Ni 16 ppm, Pb 39 ppm, Ti 55600 ppm and Zn 15 ppm.

The stripped iron solution can be used to regenerate the HCl and also it could be used to produce a value added iron oxide product.

TABLE 2

Solvent Extraction Results
Scoping Tests

| Test | Solvent | Feed Solution gpl Ti | Feed Solution gpl Fe | Dilution Ratio | pH | A/O Ratio | Raffinate gpL Ti | Raffinate gpL Fe | Extraction Ti | Extraction Fe | Comments |
|---|---|---|---|---|---|---|---|---|---|---|---|
| 13 | TBP | 3.57 | 11.7 | 10:1 | 1.0 | 1:1 | 3:84 | 5.79 | 0 | 50.5 | pH adjusted with $Ca(OH)_2$ |

EXAMPLE V

The use of diethyl phosphoric acid (DEHPA) with tributyl phosphate (TBP) to remove Vanadium was tested. A larger volume (400 ml) of feed TBP raffinate was treated under sulphur dioxide gas for one hour at 60° C. The pre-reduced aqueous solution was then contacted with HCl pre-conditioned TBP/DEHPA organic extractant for 1.5 hours at 60° C. while maintaining the $SO_2$ bubbling. The organic/aqueous emulsion was then allowed to settle and separated. The resulting aqueous raffinate had evaporated from the feed volume of 400 ml to 286 ml.

A multi-element analysis was carried out to determine vanadium transfer into the solvent. Feed aqueous and resulting TBP/DEHPA raffinate assays were as follows:

| Aqueous Feed | TBP/DEHPA Raffinate |
| --- | --- |
| Al - 560 ppm | Al - 1220 ppm |
| Cr - 370 ppm | Cr - 610 ppm |
| Cu - 48 ppm | Cu - 1.5 ppm |
| Fe - 82 ppm | Fe - 11 ppm |
| Mg - 2810 ppm | Mg - 4140 ppm |
| Mn - 460 ppm | Mn - 730 ppm |
| Ni - 50 ppm | Ni - 34 ppm |
| Ti - 31000 ppm | Ti - 36500 ppm |
| V - 360 ppm | V - 104 ppm |
| Zn - 16 ppm | Zn - 1.1 ppm |

Vanadium was extracted into the aqueous phase at an efficiency of 79.3% in a single extraction. Additionally, iron, nickel, copper and zinc were loaded into the TBP/DEHPA solvent.

EXAMPLE VI

Precipitation of $TiO_2$ was also investigated under gas-reducing conditions in conjunction with distilled water to induce titanium hydrolysis. Tri-n-butyl phosphate raffinate assaying 74.9 g/l Ti and <5 ppm Fe was agitated/heated to at least 60° C. while bubbling in 0.5 l/min $SO_2$ gas for a 2 hour interval. Once the temperature was increased to 95° C., while maintaining $SO_2$ flow, three times the volume of TBP raffinate were added as distilled water. The one-hour reaction period at 95° C. yielded a white wet-cake precipitate. Thorough re-pulp washing and oven drying resulted in a light brown solid which assayed as follows:

| | |
| --- | --- |
| Fe | 1.28 wt % |
| Cr | 0.364 wt. % |
| Si | 0.246 wt. % |
| Cu | 0.094 wt. % |
| Mg | 0.087 wt. % |
| Ni | 0.086 wt. % |
| Na | 0.052 wt. % |
| V | 0.031 wt. % |
| P | 0.030 wt. % |
| Zn | 0.029 wt. % |
| Mn | 0.028 wt. % |
| Pb | 0.023 wt. % |

All other metals were reported as <0.01 wt. % concentration. The precipitation barren solution analyzed only 2.9 ppm titanium, indicating a precipitation efficiency of greater than 99%. Other metals detected in the precipitation barren aqueous were follows:

| | |
| --- | --- |
| Al | 300 ppm |
| Ca | 220 ppm |
| Co | 4.0 ppm |
| Cr | 31 ppm |
| Cu | 11 ppm |
| Mg | 940 ppm |
| Mn | 140 ppm |
| Na | 70.9 g/L |
| Ni | 5.2 ppm |
| V | <1 ppm |
| Zn | <2 ppm |

Example VII

The production of a Titanium Dioxide product of higher purity, at about 99 or 99.9% $TiO_2$, can be achieved by removing all metal contaminants from the leach solution or by selective precipitation. Iron removal has already been demonstrated in Example V with the use of tri-n-butyl phosphate organic phase.

| | |
| --- | --- |
| Titanium | 64.7 g/l |
| Iron | <50 ppm |
| Aluminum | 650 ppm |
| Chromium | 260 ppm |
| Copper | 46 ppm |
| Magnesium | 1790 ppm |
| Manganese | 310 ppm |
| Nickel | 10 ppm |
| Vanadium | 47 ppm |

The more difficult metal contaminants to extract from aqueous hydrochloric media are vanadium and chromium. The use of a reducing agent with the TBP raffinate converts vanadium into the solvent-extractable $V^{4+}$ oxidation state. Chromium may then be separated from titanium by precipitating titanium dioxide at a low pH before chromium, aluminum, magnesium and manganese are precipitated.

In this example, a small aliquot of TBP raffinate was heated to 70° C. under magnetic stirrer bar agitation. Sulphur dioxide gas was bubbled into the aqueous solution for 30 minutes. To extract $V^{4+}$, an equal volume of 50/50 TBP(100%)/DEHPA(100%) was added to the aqueous solution. Agitation with $SO_2$ gas was continued for 1 hour at a temperature of 75° C. This low pH aqueous/organic emulsion qualitatively showed an organic appearance change from a colourless organic to a light golden yellow organic. Additionally, the heating for an extended period of time caused a pure white titanium dioxide precipitate to separate out of the aqueous solution.

Although precipitation efficiency of titanium was not established in this example, the resulting multi-element assay revealed a very pure $TiO_2$ product. The analytical results were as follows:

| | |
| --- | --- |
| Al | <0.01 wt. % |
| B | <0.01 wt. % |
| Ba | <0.01 wt. % |
| Be | <0.01 wt. % |
| Ca | <0.02 wt. % |
| Cd | <0.01 wt. % |
| Co | <0.01 wt. % |
| Cr | <0.01 wt. % |

-continued

| | | |
|---|---|---|
| Cu | | <0.01 wt. % |
| Fe | | <0.01 wt. % |
| K | | <1 wt. % |
| Mg | | <0.01 wt. % |
| Mn | | <0.01 wt. % |
| Mo | | <0.01 wt. % |
| Na | | <0.02 wt. % |
| Ni | | <0.01 wt. % |
| Pb | | <0.01 wt. % |
| Si | | <0.02 wt. % |
| V | | <0.01 wt. % |
| Zn | | <0.01 wt. % |

The resulting precipitate of $TiO_2$ was oven roasted at 1000° C. to drive off the hydrated water. The weight loss was 10%. This product obtained was >99.0% $TiO_2$. The composition of the $TiO_2$ is given in Table 3.

TABLE 3

Composition of $TiO_2$

| Element | | TBP/DEHPA Extraction $SO_2$ Reduction/ppt'n Weight % |
|---|---|---|
| Aluminum | $Al_2O_3$ | <0.01 |
| Boron | B | <0.01 |
| Barium | Ba | <0.01 |
| Beryllium | Be | <0.01 |
| Calcium | CaO | <0.01 |
| Cadmium | Cd | <0.01 |
| Cobalt | Co | <0.01 |
| Chromium | Cr | <0.01 |
| Copper | Cu | <0.01 |
| Iron | $Fe_2O_3$ | <0.01 |
| Magnesium | MgO | <0.01 |
| Manganese | Mn | <0.01 |
| Molybdenum | Mo | <0.01 |
| Phosphorus | $P_2O_5$ | <0.01 |
| Potassium | $K_2O$ | <0.01 |
| Sodium | $Na_2O$ | <0.05 |
| Nickel | Ni | <0.01 |
| Lead | Pb | <0.01 |
| Silicon | $SiO_2$ | <0.05 |
| Titanium | $TiO_2$ | >99.8 |
| Vanadium | V | <0.01 |
| Zinc | Zn | <0.01 |

To make a direct comparison to the test above, a sample of TBP raffinate was pH adjusted with 50 weight percent sodium hydroxide to the point of precipitating titanium dioxide. The addition of caustic was over a five and one-half hour period at an elevated temperature of 40° C. A solid sample obtained was thoroughly washed and dried.

The precipitation barren solution measured at a pH equal to <0.0. A multi-element analysis of the hydrolyzed product showed metal contaminants higher than achieved above with DEHPA present. Analysis of key elements are as follows:

| | |
|---|---|
| Chromium | <0.01 wt. % |
| Iron | <0.01 wt. % |
| Magnesium | <0.01 wt. % |
| Manganese | <0.01 wt. % |
| Aluminum | <0.01 wt. % |
| Vanadium | 0.021 wt. % |
| Zinc | 0.011 wt. % |

Calcination of the precipitate will increase the concentration of $TiO_2$, but, will also elevate the levels of zinc and vanadium. The use of TBP/DEHPA allows extraction of vanadium and zinc. Controlled hydrolysis of titanium dioxide at a low pH may result in the prevention of co-precipitation of chromium.

In another test, an aliquot of TBP raffinate was tested to quantitatively determine the precipitation efficiency of titanium from TBP raffinate using $SO_2$ and TBP/DEHPA. The extraction of Vanadium was carried out at a phase ratio equal to one, but at a lower contact temperature of 50° C. The organic/aqueous contact interval was extended to 2 hours at this lower temperature while maintaining the reducing atmosphere with $SO_2$ gas. After disengaging both phases, the aqueous solution was separated from the loaded organic. Again, sulphur dioxide gas was bubbled into the aqueous solution while the temperature was raised to 90° C. or higher. The 150–160 milliliters of treated TBP raffinate was diluted with 300 milliliters of distilled water to initiate precipitation of the titanium dioxide. The dehydration period to form TiO2 was extended for 2.5 hours. The resulting white precipitate was mild HCl washed followed by a distilled water wash and then oven dried at 100° C. The analytical results of the 80 milliliters precipitation barren and the multi-element analysis of the white precipitate are follows:

| Precipitation Barren (80 ml) | | Washed $TiO_2$ Precipitate | |
|---|---|---|---|
| Al | 1570 ppm | Al | <0.01 wt % |
| Cr | 1310 ppm | Cr | <0.01 wt % |
| Cu | 4.8 ppm | Cu | <0.01 wt % |
| Fe | 1990 ppm | Fe | <0.01 wt % |
| Mg | 4590 ppm | Mg | <0.01 wt % |
| Mn | 790 ppm | Mn | <0.01 wt % |
| Ni | 320 ppm | Ni | <0.01 wt % |
| Mo | N/A | Mo | <0.01 wt % |
| Si | <50 ppm | Si | <0.05 wt % |
| Na | N/A | Na | <0.05 wt % |
| Ti | 5590 ppm | Ti | 58.0 wt % |
| V | 1200 ppm | V | <0.01 wt % |
| Zn | 21 ppm | Zn | <0.01 wt % |

The analytical results above clearly show that the dehydration of titanium dioxide takes place at a low pH (pH<0.0), and other metal contaminants will not co-precipitate. The $TiO_2$ product obtained is a hydrated oxide that requires further roasting to produce a >99.8% pure solid. The precipitation efficiency of titanium calculates to be 94.8% based on the assay results above.

EXAMPLE VIII

A series of leaching tests were aimed at exploring the phenomenon that occurred when leaching at about 90° C. that caused some titanium in solution to precipitate during HCl extraction of ilmenite. At high chloride concentrations and low pH, iron can form anionic chloro complexes and halo metallic acid ($H^+FeCl^-_4$) and remain in solution after leaching. Titanium forms anionic chloro complexes at high chloride concentrations and low pH, $H_2TiCl_6$ with relatively less efficiency. It is possible to dehydrate dissolved titanium compounds and obtain titanium dioxide compounds. This approach was tested in a series of subsequent tests, to potentially eliminate additional iron reduction with $SO_2$ and liquid/solid separation stages. Another additional advantage of this approach is the elimination of sulphate in leaching, improving effluent recycling for pyrohydrolysis, potentially eliminating sulphur in the $TiO_2$ product and hence in subsequent purification tests.

These tests used a concentrate that contained 19.7% Ti. There were six tests performed. The first two tests produced 91.7% and 97.6% of the Ti in the precipitate and 98.6% and 96.7% of the Fe in solution. Excess HCl was added and the Ti in the precipitate was decreased. The leaching time was decreased to 30 minutes from 2 hours and the amount of Ti in the precipitate was decreased to 80%. In another test, the leaching temperature was held at 70° C. for two hours then the temperature was increased to 95° C. for one hour. The precipitate contained 53.1% Ti.

A further set of leaching tests were aimed at exploring the phenomenon that occurred when leaching at about 95° C. that caused some titanium to precipitate with the use of an oxidant. The oxidants tested were oxygen gas and sodium chlorate ($NaClO_3$). Also for these tests, the precipitate was screened on 200 mesh and the two fractions were assayed for Ti and Fe. Screening was used because as a precipitate was formed it would be fine material as compared to unleached material (concentrate). For these tests, the acid level was maintained at 44% excess and oxidant was added only after 2 hours of leaching. These tests demonstrated that the Ti can be precipitated with 95% of the Ti reporting to the minus 200 mesh fraction; the iron level was about 1%. The results were reproducible with a repeat test and the amount of material treated was increased to 200 grams. The amount of iron extracted and present in the leach solution was about 97% for most of the tests.

Another set of tests was performed to optimize the amount of acid and oxidant used. Lowering the acid used to stoichiometric amount and lower amounts of oxidant caused the amount of Ti reporting to the fine fraction to decrease to about 60% and iron level increase to 1.5 to 2% in this fine fraction. If the oxidant was held constant at 1.5 g of $NaClO_3$ per 100 grams of concentrate and the acid was increased to 20% or 30% excess, the Ti reporting to the fine fraction was 86% with 0.31 to 0.51% iron at the respective acid excess level. On the basis of these tests, an optimum condition is 3g of $NaClO_3$ per 100 grams of concentrate and 20% excess acid, under which the Ti reporting to the fine fraction is greater than 90% with an Fe level of 0.5% in the fine fraction. Oxygen was tested using the same conditions of acid, time and temperature and 86% of the Ti reported to the fine fraction and the Fe level was 0.9% in the fine fraction.

A multi-elemental analysis was conducted on the precipitation products, and two results are presented in Table 4. Further details of these tests are provided in Tables 5 and 6.

TABLE 4

Composition of $TiO_2$ Products made in the Testwork

| Element | | Leach Test A 200 Mesh Leach Residue Weight % | Leach Test B 200 Mesh Leach Residue Weight % |
|---|---|---|---|
| Aluminum | $Al_2O_3$ | 0.32 | N/A |
| Boron | B | <0.01 | NA |
| Barium | Ba | <0.01 | N/A |
| Beryllium | Be | <0.01 | N/A |
| Calcium | CaO | 0.16 | 1.56 |
| Cadmium | Cd | <0.01 | N/A |
| Cobalt | Co | <0.01 | N/A |
| Chromium | Cr | <0.01 | N/A |
| Copper | Cu | <0.01 | N/A |
| Iron | $Fe_2O_3$ | 0.96 | 0.803 |
| Magnesium | MgO | 0.33 | N/A |
| Manganese | Mn | <0.01 | NA |
| Molybdenum | Mo | <0.01 | N/A |
| Phosphorus | $P_2O_5$ | N/A | N/A |
| Potassium | $K_2O$ | N/A | N/A |
| Sodium | $Na_2O$ | 0.13 | N/A |
| Nickel | Ni | <0.01 | N/A |
| Lead | Pb | <0.01 | N/A |
| Silicon | $SiO_2$ | 3.74 | N/A |
| Titanium | $TiO_2$ | >94.35 | >97.0 |
| Vanadium | V | <0.01 | N/A |
| Zinc | Zn | <0.01 | N/A |

TABLE 5

| Test | A (110% Stoichiomeric Cl- from HCl used on T12 (+100 M/+150 M) Spiral Concentrate) |
|---|---|
| Material | 62.0 wt % Passing 100 Mesh |
| Temperature | 95+ deg C. |
| Time Hours | 3 Total |
| Leachant System | 413.9 g conc HCl, 5.0 g $NaClO_3$ oxidant addition |
| Feed Amount | 100 grams of T12 (+100/+150 M) Spiral Concentrate |
| Initial Solution | 347.8 ml HCl + 0 ml $H_2O$ |

| | Vol | Wt | Assay - mg/l or wt % | | Weight Recovered-g | | % Recovered (Head) | | Material Balance % | |
|---|---|---|---|---|---|---|---|---|---|---|
| Test Sample | ml | g | Ti | Fe | Ti | Fe | Ti | Fe | Ti | Fe |
| Feed Solids | | 100.1 | 20.42 | 40.19 | 20.440 | 40.230 | | | | |
| Filtrate-Pregnant | 326 | | 430 | 110000 | 0.140 | 35.860 | 0.69 | 89.14 | 0.72 | 89.94 |
| Acid Wash Water | 855 | | 68 | 3360 | 0.058 | 2.873 | 0.28 | 7.14 | 0.30 | 7.21 |
| Wash Water | 510 | | 140 | 110 | 0.071 | 0.056 | 0.35 | 0.14 | 0.37 | 0.14 |
| | | | | | | | | | 1.39 | 97.27 |
| Tails + 200 Mesh | | 17.30 | 31.20 | 5.08 | 5.40 | 0.88 | 26.41 | 2.18 | 27.87 | 2.20 |
| Tails − 200 Mesh | | 27.40 | 50.00 | 0.746 | 13.70 | 0.20 | 67.02 | 0.51 | 70.74 | 0.51 |
| % Dissolution Weight Dissolved | | 55.4 | | | | | | | | |
| Totals | | | | | 19.367 | 39.872 | 94.75 | 99.11 | 100.00 | 100.00 |
| Calculated Head | Titanium | 19.3 | | | | | | | | |
| | Iron | 39.8 | | | | | | | | |

TABLE 6

| | | |
|---|---|---|
| Test | B (120% Stoichiomeric Cl- from HCl used on T12 (+100 M/+150 M Spiral Concentrate) | |
| Material | 63.0 wt % Passing 100 Mesh | |
| Temperature | 95+ deg C. | |
| Time Hours | 3 Total | |
| Leachant System | 451.6 g conc HCl, 1.50 g NaClO$_3$ oxidant addition | |
| Feed Amount | 100 grams of T12 (+100/+150 M) Spiral Concentrate | |
| Initial Solution | 379.5 ml HCl + 0 ml H$_2$O | |

| Test Sample | Vol ml | Wt g | Assay - mg/l or wt % Ti | Assay - mg/l or wt % Fe | Weight Recovered-g Ti | Weight Recovered-g Fe | % Recovered (Head) Ti | % Recovered (Head) Fe | Material Balance % Ti | Material Balance % Fe |
|---|---|---|---|---|---|---|---|---|---|---|
| Feed Solids | | 100 | 19.5 | 38.7 | 19.500 | 38.700 | | | | |
| Filtrate-Pregnant | 362 | | 1880 | 101000 | 0.681 | 36.562 | 3.49 | 94.48 | 3.46 | 90.83 |
| Acid Wash Water | 780 | | 64 | 3480 | 0.050 | 2.714 | 0.26 | 7.01 | 0.25 | 6.74 |
| Wash Water | 505 | | 8.2 | 110 | 0.004 | 0.056 | 0.02 | 0.14 | 0.02 | 0.14 |
| | | | | | | | | | 3.73 | 97.71 |
| Tails + 200 Mesh | | 10.40 | 18.40 | 7.35 | 1.91 | 0.76 | 9.81 | 1.98 | 9.73 | 1.90 |
| Tails − 200 Mesh | | 32.80 | 51.90 | 0.480 | 17.02 | 0.16 | 87.30 | 0.41 | 86.54 | 0.39 |
| % Dissolution Weight Dissolved | | 56.8 | | | | | | | | |
| Totals | | | | | 19.67 | 40.254 | 100.88 | 104.01 | 100.00 | 100.00 |
| Calculated Head | Titanium | 19.7 | | | | | | | | |
| | Iron | 40.3 | | | | | | | | |

What is claimed is:

1. A method for the separation of titanium from titanium-bearing ore, comprising the steps of:
   a) leaching said ore or a concentrate thereof with an aqueous solution of an hydrogen halide at a temperature of at least 90° C. to provide a leach solution containing titanium halide;
   b) separating solids from the leach solution to provide a leachate solution;
   c) subjecting the leachate solution to extraction with an immiscible organic phase to form an organic phase containing titanium halide, wherein said organic phase and titanium halide have boiling points that differ by at least 50° C.; and
   d) stripping titanium halide from said organic phase containing titanium halide by heating to volatilize titanium halide and effect separation of said titanium halide from the organic phase.

2. The method of claim 1 in which the titanium bearing ore is concentrated in titanium values by calcining, reduction and smelting in any combination to produce a titanium rich slag and separate iron as a marketable iron product.

3. The method of claim 1 in which the titanium bearing ore is concentrated in titanium values by calcining, reduction and leaching to remove iron values.

4. The method of claim 1 in which the organic phase is selected from the group consisting of crown ether, phosphine acid, phosphine ester, phosphine oxide, tertiary ammonium salt and quaternary ammonium salt.

5. The method of claim 1 in which titanium metal is recovered from the titanium halide of step(d).

6. A method of separating a titanium halide from a concentrated aqueous solution of the titanium halide, said titanium halide being in a concentration such that the titanium halide is stable in said aqueous solution, comprising:
   a) admixing said aqueous solution with an organic phase having a boiling point that differs from the boiling point of the titanium halide by at least 50° C. to form an organic phase containing titanium halide;
   b) separating said organic phase containing titanium halide from the aqueous solution; and
   c) heating the organic phase to strip titanium halide therefrom.

7. The method of claim 6 in which the titanium halide is titanium tetrahalide.

8. The method of claim 6 in which the organic phase is selected from the group consisting of crown either, phosphine acid, phosphine ester, phosphine oxide, tertiary ammonium salt and quaternary ammonium salt.

9. The method of claim 7 in which the titanium tetrahalide is titanium tetrachloride.

10. The method of claim 7 in which the titanium tetrahalide is separated by volatilization of the titanium tetrahalide.

11. The method of claim 7 in which the organic phase has a boiling point at least 50° C. higher than that of the titanium tetrahalide.

12. The method of claim 7 in which the organic phase has a boiling point at least 50° C. lower than that of the titanium tetrahalide.

* * * * *